(12) United States Patent
Yoneyama et al.

(10) Patent No.: US 6,483,601 B1
(45) Date of Patent: Nov. 19, 2002

(54) IMAGE FORMING APPARATUS

(75) Inventors: Tsuyoshi Yoneyama, Toyokawa (JP); Yuuji Takarabe, Toyohashi (JP); Takashi Onishi, Toyohashi (JP)

(73) Assignee: Minolta Co., Ltd., Osaka (JP)

( * ) Notice: Subject to any disclaimer, the term of this patent is extended or adjusted under 35 U.S.C. 154(b) by 0 days.

(21) Appl. No.: 09/332,160

(22) Filed: Jun. 14, 1999

(30) Foreign Application Priority Data

Jun. 15, 1998 (JP) .......................................... 10-167427

(51) Int. Cl.[7] .............................. G06F 3/12; G06F 13/00
(52) U.S. Cl. ...................... 358/1.15; 358/1.13; 358/1.14
(58) Field of Search ............................... 358/1.15, 1.13, 358/1.9, 1.14; 399/82; 270/58; 101/71

(56) References Cited

U.S. PATENT DOCUMENTS 5,603,492 A * 2/1997 Mandel et al. ........... 270/58.09
5,881,337 A * 3/1999 Higashikawa et al. ........ 399/82

FOREIGN PATENT DOCUMENTS

JP        09272657       10/1997       .......... B65H/39/11

* cited by examiner

*Primary Examiner*—Joseph Mancuso
*Assistant Examiner*—Douglas Tran
(74) *Attorney, Agent, or Firm*—McDermott, Will & Emery

(57) ABSTRACT

Provided is an image forming apparatus that has a plurality of sheet discharge bins and is connected to a communications line. This image forming apparatus has a mail box function for discharging a sheet on which an image is formed on the basis of image data transmitted from a specified computer into a specified sheet discharge bin and a job separate function for performing sorting by changing the sheet discharge bin to be used for each job, and the functions can be switched over.

11 Claims, 4 Drawing Sheets

IMAGE FORMING APPARATUS

RELATED APPLICATION

This application is based on application No. 10-167427 filed in Japan, the content of which is hereby incorporated by reference.

BACKGROUND OF THE INVENTION

1. Field of the Invention

The present invention relates to an image forming apparatus that can be connected to a plurality of external equipment terminals, executes image formation on the basis of data transmitted from those external equipment terminals and is provided with a plurality of sheet discharge bins.

2. Description of the Related Art

Conventionally, there have been image forming apparatuses such as a printer and a facsimile that are connected to a personal computer (abbreviated to a computer hereinafter) connected to a network and execute image formation on the basis of instructions from each computer connected to the network. Those image forming apparatuses include a type that discharges a sheet obtained after image formation into a sheet discharge bin (referred to as a mail bin hereinafter) peculiar to each computer. That is, there is known a type that uses the mail bin as a mail box.

There is another type that assigns a mail bin for each print job resulting from an image forming instruction from each computer connected to a network. That is, there is known the type that uses the mail bin as a job separate tray.

When using the mail bin as a mail box, print jobs from a particular computer are discharged into a particular mail bin. Therefore, the user of each computer is only required to fetch the sheet from the peculiar mail bin (mail box) assigned to that user. Accordingly, when fetching the sheet, the user has no uncertainty about the mail bin into which the user's print job has been discharged. However, when there is a plurality of print jobs from a particular computer (user), all the jobs are discharged into the mail bin (mail box). As a result, the sheets for each job must be sorted from the group of sheets discharged into that one bin. This work can be very troublesome to the user.

By contrast, when the mail bin is used as a job separate tray, there is no need for sorting the sheets, as has been required when using the mail bin as a mail box. However, on the contrary, a number of mail bins are sometimes occupied by a plurality of jobs of one user. The occurrence of such a case is very inconvenient for the other users (computers) connected to the network. That is, both the case where the mail bin is used as a mail box and the case where the mail bin is used as a job separate tray have advantages and disadvantages.

SUMMARY OF THE INVENTION

One object of the present invention is to solve the aforementioned problems.

Another object of the present invention is to provide a handy printer connected to a network for a plurality of computers (users) connected to the network.

Yet another object of the present invention is to enable a plurality of sheet discharge trays (mail bins) of a printer connected to a network to be used in a mode that is easy to use for the users.

Still another object of the present invention is to provide a printer that can use a plurality of sheet discharge trays (mail bins) of a printer connected to a network as either a mail box or a job separate tray.

These and other objects are attained by an image forming apparatus having an image forming section, a plurality of bins for accommodating a sheet on which an image is formed by the image forming section, a receiver for receiving image data, a first discharger for discharging the sheet on which an image is formed on the basis of the image data transmitted from a first apparatus into a first bin and discharging the sheet on which an image is formed on the basis of the image data transmitted from a second apparatus into a second bin, a second discharger for discharging the sheet on which an image is formed on the basis of the image data that is included in a first job and transmitted from the first apparatus into the first bin and discharging the sheet on which an image is formed on the basis of the image data that is included in a second job and transmitted from the first apparatus into the second bin, and a switch for executing switching to determine whether the sheet is to be discharged by the first discharger or discharged by the second discharger.

The invention itself, together with further objects and attendant advantages, will best be understood by reference to the following detailed description taken in conjunction with the accompanying drawings.

BRIEF DESCRIPTION OF THE DRAWINGS

In the following description, like parts are designaged by like reference numbers throughout the several drawings.

DESCRIPTION OF THE PREFERRED EMBODIMENT

Figure 1:
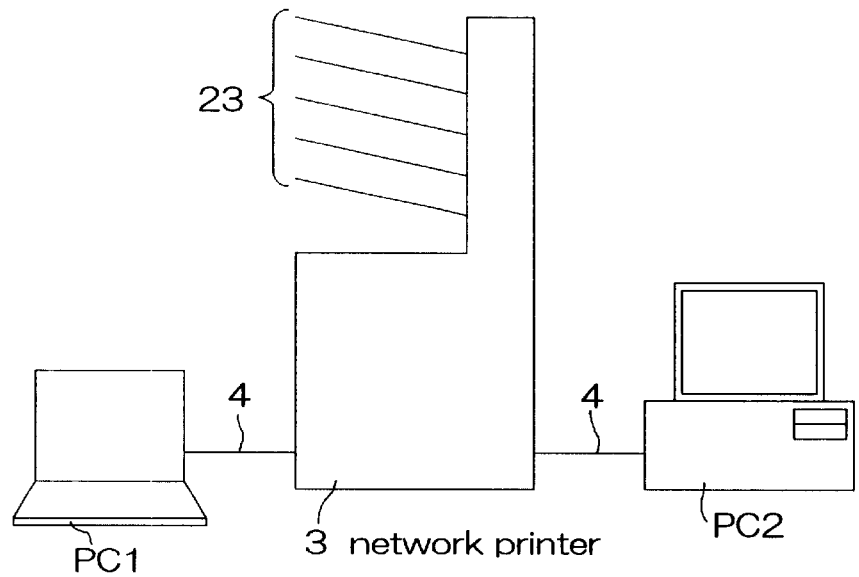
FIG. 1 is a schematic view of the entire image forming apparatus.

An image forming apparatus connected to a network, according to one embodiment of the present invention, will be described with reference to the drawings. FIG. 1 shows the overall construction of the network. A plurality of computers 1 and 2 (referred to as PC1 and PC2 hereinafter) that serve as external equipment terminals and a network printer 3 that serves as an image forming apparatus are connected via a LAN 4. PC1 indicates a notebook type computer, while PC2 indicates a desktop type computer. In this case, the network printer 3 is provided with a plurality of sheet discharge trays 23 (mail bins) for sorting discharged sheets of print jobs obtained after image formation. The construction of this network printer 3 will be described in detail later.

Figure 2:
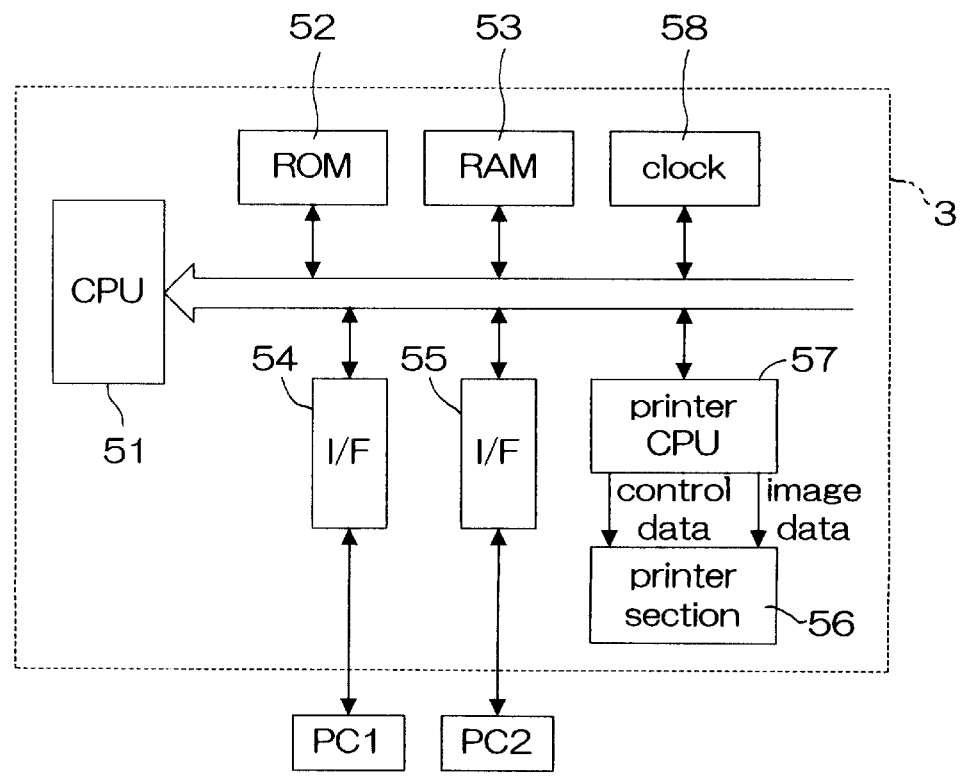
FIG. 2 is a block diagram showing the construction of the image forming apparatus.

FIG. 2 is a block diagram showing the construction of the network printer 3. This network printer 3 is constructed of a CPU 51 for executing control of the entire operation, a ROM 52 for storing a control process program, a RAM 53 for storing data, interfaces 54 and 55, a printer CPU 57 for executing control of a printing section 56 for performing an image forming operation (this CPU also executes control of sheet discharging into the mail bins) and a clock 58.

The PCs 1 and 2 output image data representing letters, figures and so on as well as control data (command data) for controlling the network printer 3 to the network printer 3 via the interfaces 54 and 55. The control data includes a signal for issuing instructions for executing printing as well as identification signals of the PCs 1 and 2 that transmit the control data. The CPU 51 instructs the printer CPU 57 to change the sheet discharge bin for use according to the received signals. For example, when the mail bins 23 are used as a mail box, each sheet is discharged into the peculiar mail boxes corresponding to the PCs 1 and 2 that instruct the print job on the basis of the identification signal.

In this case, there are prepared a mode (first sheet discharge mode) in which the mail bins 23 are used as a mail box and a mode (second sheet discharge mode) in which the mail bins 23 are used as a job separate tray. In the first sheet discharge mode, each sheet that has undergone image formation based on the print job from a particular PC is discharged into a particular mail box. By contrast, in the second sheet discharge mode, the mail bins 23 are used as a job separate tray. That is, sheets that have undergone image formation are discharged into different bins for each print job. The CPU 51 can be controlled so as to switch over the operating state between these sheet discharge modes according to a specified condition, e.g., every specified time zone based on the clock 58. This control will be explained by using a flowchart described later.

Upon receiving a printing instruction signal in the control data from the PCs 1 and 2 via the interfaces 54 and 55, the network printer 3 executes printing in the printer section 56 according to the image data. The printing is executed by the known laser beam type or the like.

Figure 3:
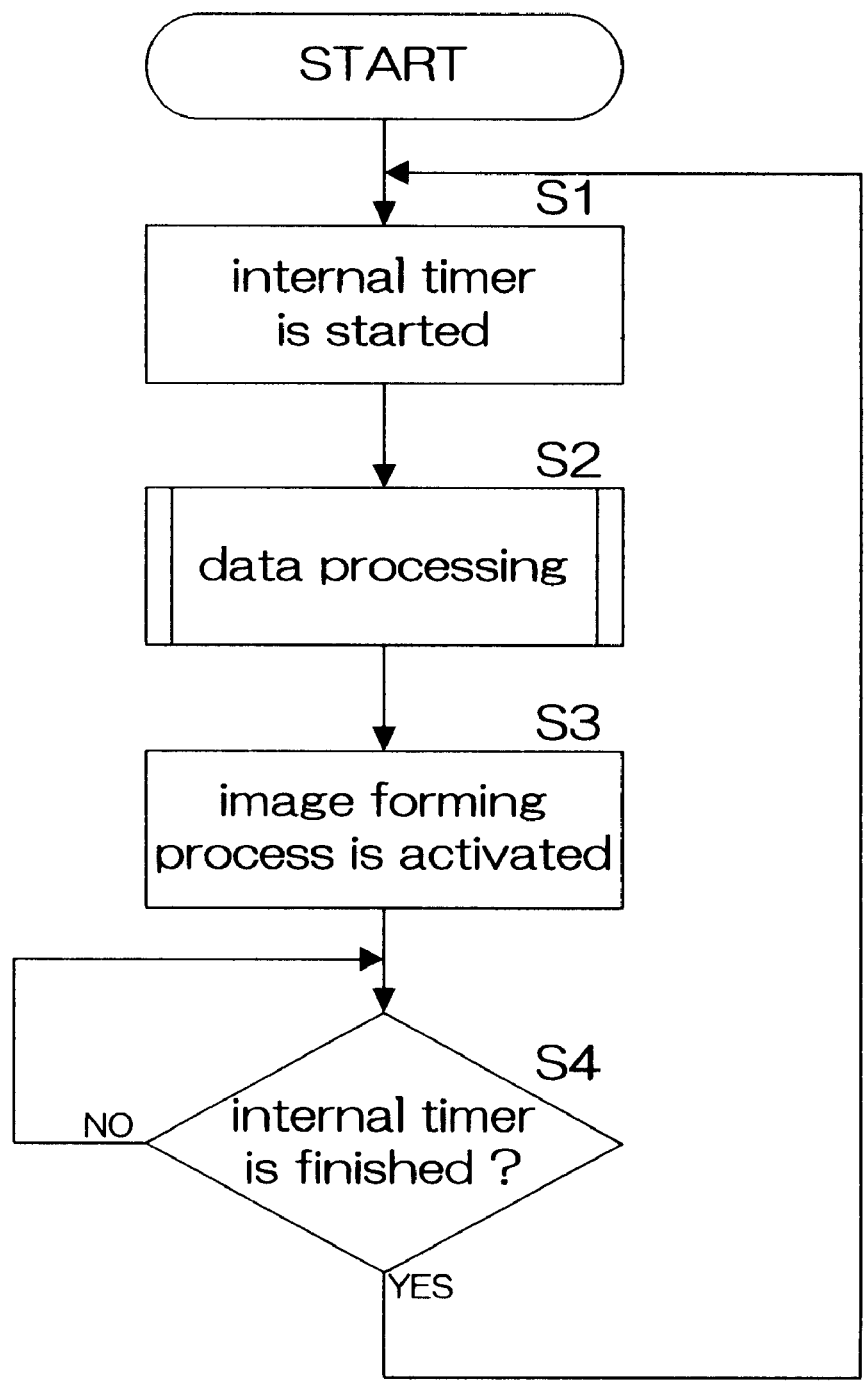
FIG. 3 is a flowchart showing the control of the image forming apparatus.

The control of the network printer 3 by the CPU 51 will be described by using the flowchart of FIG. 3. The CPU 51 first starts an internal timer for defining one routine of a data image forming operation (for checking whether the processing is being correctly executed) (step S1). Next, the CPU 51 executes data processing of the image formation and determination of a mail bin 23 and so on between the computer (PC) and the network printer 3 (S2). Next, the image forming process is activated (S3) and thereafter the end of the internal timer operation is detected (S4).

Figure 4:
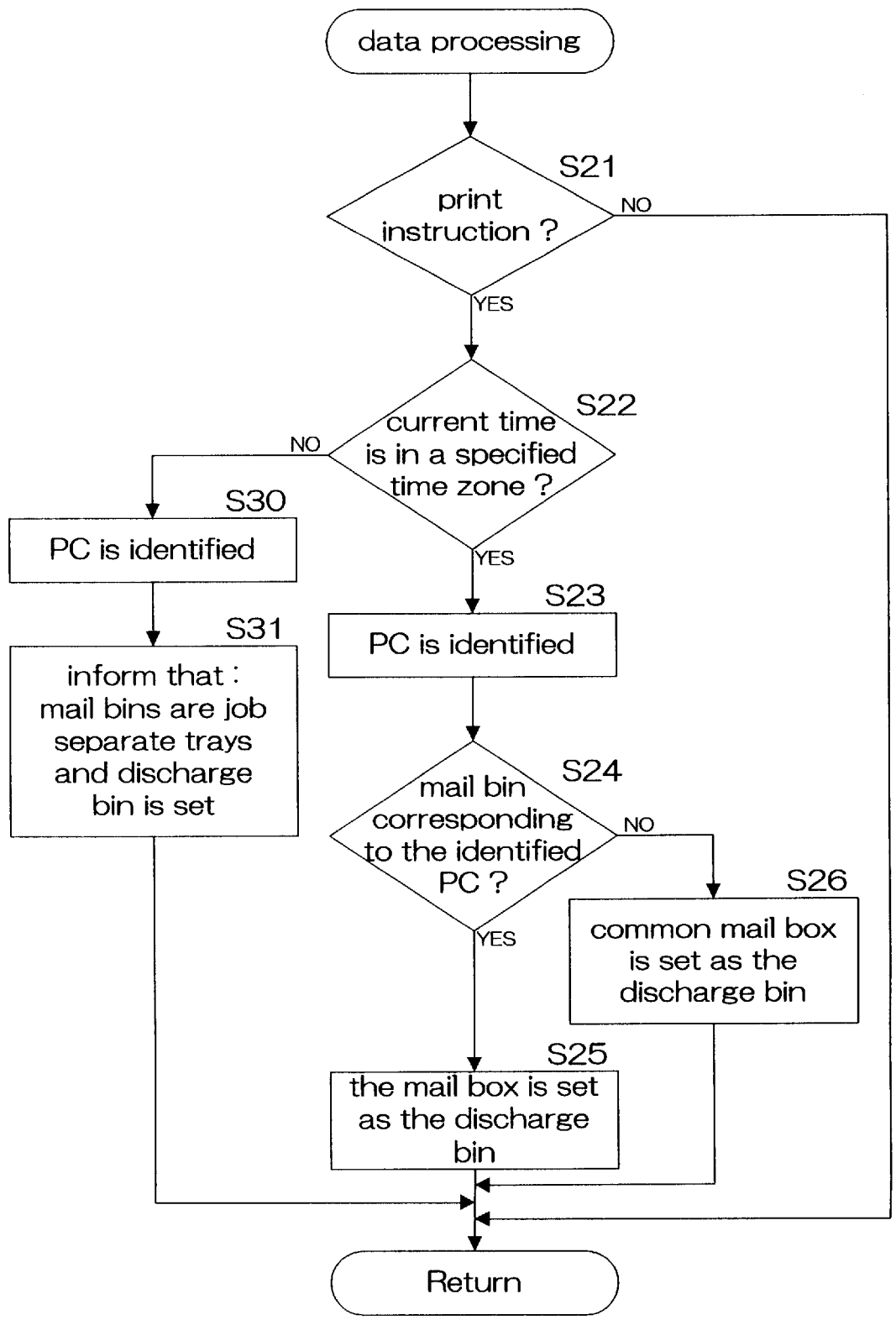
FIG. 4 is a flowchart showing data processing control.

The data processing in S2 will be described next with reference to the flowchart of FIG. 4. The CPU 51 first determines whether or not a printing instruction is issued from the computer (PC) to the network printer 3 (S21). When a printing instruction occurs (YES in S21), it is determined whether or not the current time is in a specified time zone (S22). This specified time zone is the time zone (8:00 to 17:00 corresponding to the working hours) in, for example, an office, during which the network printer 3 is expected to be used by a number of users. In this stage, when the current time is in the specified time zone (YES in S22), setting for using the mail bins as a mail box is executed as shown in S23 to S26.

The setting in the case where the mail bins are used as a mail box will be described below. First, in S23, the computer (PC) that has issued the print job is identified. This identification is executed by the CPU 51 of the network printer 3 by detecting the identification signal inside the control data. Then, in S24, the presence or absence of the peculiar mail bin corresponding to the identified computer (PC) is determined. In this stage, when the mail bin corresponding to the identified computer (PC) exists, i.e., when the mail box corresponding to the computer (PC) is set (YES in S24), the mail box is set as the mail bin into which the sheet is to be discharged (S25), and the program flow returns. By contrast, when the mail bin corresponding to the identified computer (PC) does not exist, i.e., when the mail box corresponding to the computer (PC) is not set (NO in S24), a common mail box is set as the mail bin into which the sheet is to be discharged (S26), and the program flow returns.

When the current time is not in the specified time zone, or, for example, in a time zone of overtime work other than the working hours (NO in S22), this network printer 3 is expected to be used by a small number of users. Therefore, as shown in S30 to S31 described later, the setting for using the mail bins as job separate trays is executed.

The setting for using the mail bins as job separate trays will be described below. First, in S30, the computer (PC) that has issued a print job instruction is identified. This identification is executed by the CPU 51 of the network printer 3 by detecting the identification signal in the control data. Then, in S31, a signal for informing the identified computer (PC) of the fact that the mail bins are currently being used as job separate trays is output. In this stage, the computer is informed of the position of the mail bin which serves as the job separate tray and into which the sheet of the print job is discharged. This is to solve the problem of the difficulty of each PC user to perceive the position where the user's own print job is discharged when the mail bins are used as the job separate trays although the user has no uncertainty about the position where the user's own print job is discharged when the mail bins are used as the mail box since the position of the mail bin is peculiar to each PC user. Then, after the notification of these pieces of information is made, the program flow returns.

A concrete example will be described below. It is assumed now that the mail box (mail bin) peculiar to the PC1 is the first bin and the mail box (mail bin) peculiar to the PC2 is the second bin.

(1) In a case where a printing instruction is issued from the PC1 at 9:00, all (any number of copies) of the sheets are discharged into the first bin.

(2) In a case where a printing instruction of four copies is issued from the PC1 at 19:00, now assuming a state in which no sheet has been taken out of the first bin among ten bins, then the sheets are discharged while being sorted into the second bin through fifth bin.

In the case of (2), display information appears on the PC screen stating, "The mail bins are currently being used as job separate trays. Your print jobs will be discharged into the second bin through fifth bin."

Such a display is not limited to the display information on the PC screen and notification may be made by a sound or buzzer. The aforementioned time zone should preferably be constructed so that the setting thereof can be arbitrarily changed according to the office environments and the like of the user.

Figure 5:
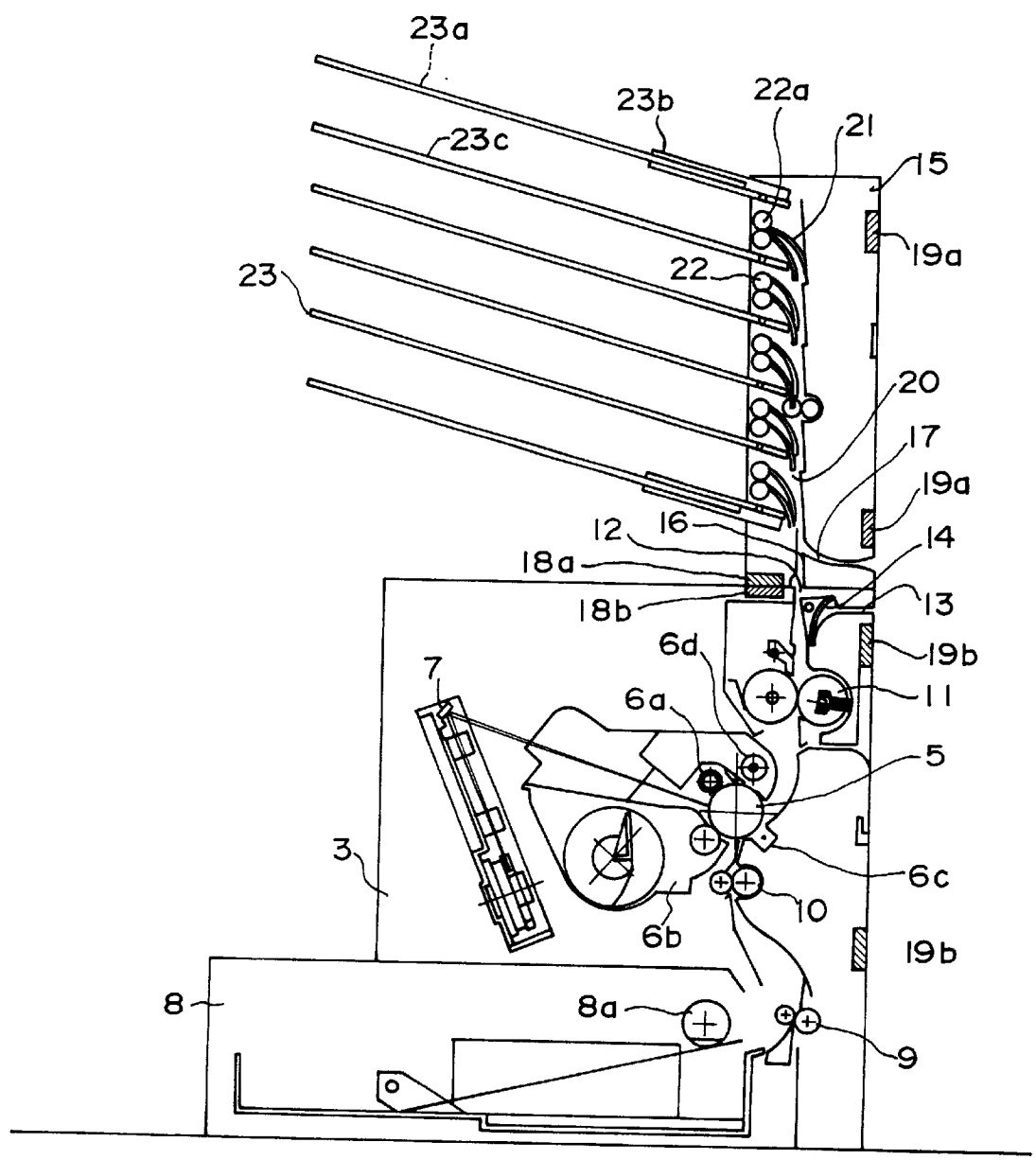
FIG. 5 is a sectional view of the image forming apparatus.

FIG. 5 is a sectional view of the network printer 3. This network printer 3 is provided with a sheet postprocessing unit 15 having a plurality of sheet discharge bins 23 in the upper portion of the main body. The main body of the network printer 3 is constructed as a compact page printer and internally has a photoreceptor 5. Around this photoreceptor 5 are arranged a charging unit 6a, a developing unit 6b storing a developer, a transfer unit 6c and a cleaning unit 6d, in this order, in the direction of rotation of the photoreceptor 5. Further, an exposure unit 7 for forming a latent image on the photoreceptor 5 is arranged at the developing section between the charging unit 6a and the developing unit 6b. Further, in the lower portion of the main body is arranged at least one sheet supply cassette 8 that internally has a sheet supply unit 8a.

The charging unit 6a executes uniform electric charging on the photoreceptor 5, and thereafter the exposure unit 7 executes the writing of an image on the photoreceptor 5 by means of a laser beam. By developing the latent image formed by it using a toner supplied from the developing unit 6b, a toner image is formed on the photoreceptor 5. On the other hand, a sheet supplied from the sheet supply unit 8a is conveyed to a registration roller 10 by means of the conveyance roller 9. The registration roller 10 adjusts the leading end position of the sheet, and the sheet is conveyed to the transfer unit 6c in synchronization with the toner image formed on the photoreceptor 5. Then, the toner image formed on the photoreceptor 5 is transferred onto the sheet by the transfer unit 6c. Subsequently, the toner remaining on the photoreceptor 5 is cleaned by the cleaning unit 6d, thereby allowing the next image formation to be executed. The sheet on which the toner image has been transferred is fixed through a fixing unit 11 and conveyed to the sheet postprocessing unit 15 through a sheet conveyance path immediately behind the fixing unit 11.

In the present embodiment, this sheet conveyance path diverges into a path 12 and a path 13, and the sheet path to be used is switched over by a diverting gate 14 that pivots around a pivot point. In the illustrated state, the sheet conveyance path 12 is selected and the sheet is conveyed through this sheet conveyance path 12 and a sheet conveyance path 16 of the sheet postprocessing unit 15 to a common distribution path 20 inside the sheet postprocessing unit 15. Along the distribution path 20 is provided a plurality of pivotal distribution gates 21, and any one of the distribution gates 21 selected under instructions from a printer controller (not shown) pivots. The sheets are guided along the gate 21 by a sheet discharge roller pair 22 and discharged sequentially from the first page with the printed surface down with respect to the sheet discharge bins 23.

The main body of the network printer 3 and the sheet postprocessing unit 15 are fixed to each other by screws or the like by means of a mounting section 18a provided on the sheet postprocessing unit 15 side and a mounting section 18b provided on the main body side. On the sheet postprocessing unit 15 side is provided a mounting section 19a aside from the mounting section 18a. On the main body side is provided a mounting section 19b aside from the mounting section 18b. The sheet postprocessing unit 15 can also be used in a state in which it is mounted on the side surface of the main body of the network printer 3, while the mounting section 19a and the mounting section 19b are used in the case. In the state of use, each sheet is discharged with the printed surface up with respect to the sheet discharge bins 23.

It is to be noted that the present invention is not limited to the construction of the aforementioned embodiment, and a variety of modifications can be achieved. For example, in the aforementioned embodiment, the time zone was adopted as a condition for switching over between the mail box and the job separate. However, the present invention is not limited to that, and the switchover can be arbitrarily effected in accordance with a variety of user needs. That is, it is acceptable to effect the switchover according to an order for effecting switchover from the user. In that case, it is acceptable to effect the switchover by software from the PC or effect the switchover by means of the operation panel of the printer. Otherwise, a changeover switch may be provided on the printer.

Although the aforementioned embodiment has been described in connection with the printer that is connected to the network and used as an image forming apparatus, the invention is not limited to the printer connected to the network. For example, the present invention can also be applied to a facsimile apparatus connected by way of a telephone line.

Although the example in which two PCs are connected to the network is shown in the aforementioned embodiment, an arbitrary number of PCs and printers may be connected.

As described above, according to the present embodiment, the functions of the sheet discharge bins can be switched over. Therefore, the mode in which a specified sheet discharge bin is used as the mail box peculiar to each equipment terminal and the mode in which the bins are used as the job separate trays for sorting the discharged sheets into the sheet discharge bins for each print job from the terminal can be switched over for use at the appropriate times. As a result, the merits of the modes can be utilized. That is, in the mode in which the bins are used as the mail box, each print job from a particular equipment terminal is discharged into a particular mail bin. Therefore, the user of each terminal equipment is only required to fetch the sheet from the peculiar sheet discharge bin assigned to the user, and accordingly, the user can immediately perceive which mail bin the user's own print job has been discharged into. In the mode in which the bins are used as the job separate trays, there is no need for performing sorting. By effecting switchover between these modes according to, for example, the specified time zone, the sheet discharge bins can be very efficiently used.

Although the present invention has been fully described by way of examples with reference to the accompanying drawings, it is to be noted that various changes and modifications will be apparent to those skilled in the art. Therefore, unless such changes and modifications depart from the scope of the present invention, they should be construed as being included therein.

What is claimed is:

1. An image forming apparatus, comprising:
   an image forming section;
   a plurality of bins for accommodating a sheet on which an image is formed by the image forming section;
   a receiver for receiving image data;
   first discharge means for discharging a sheet on which an image is formed based on image data transmitted from a first apparatus into a first bin and discharging a sheet on which an image is formed based on image data transmitted from a second apparatus into a second bin;
   second discharge means for discharging a sheet on which an image is formed based on image data included in a first job and transmitted from the first apparatus into the first bin and discharging a sheet on which an image is formed based on image data included in a second job and transmitted from the first apparatus into the second bin; and
   a switch for switching a discharging way between discharge by the first discharge means and by the second discharge means.

2. An image forming apparatus of claim 1, wherein the first apparatus and the second apparatus are to be connected with the image forming apparatus through a network.

3. An image forming apparatus of claim 1, wherein the switch switches the discharging way according to a specified condition.

4. An image forming apparatus of claim 3, further comprising:
   a timer; wherein the switch switches the discharging way every predetermined time.

5. An image forming apparatus, comprising:
   an image forming section;
   a plurality of bins for accommodating a sheet on which an image is formed by the image forming section;

a receiver for receiving image data;

discharge means for having a first discharge mode in which a sheet on which an image is formed based on image data transmitted from a first apparatus is discharged into a first bin and a sheet on which an image is formed based on image data transmitted from a second apparatus is discharged into a second bin, and a second discharge mode in which a sheet on which an image is formed based on image data included in a first job and transmitted from the first apparatus is discharged into the first bin and a sheet on which an image is formed based on image data included in a second job transmitted from the first apparatus is discharged into the second bin; and a switch for switching a discharging mode between the first discharge mode and the second discharge mode.

6. An image forming apparatus of claim 5, wherein the first apparatus and the second apparatus are to be connected with the image forming apparatus through a network.

7. An image forming apparatus of claim 5, wherein the switch switches the discharging way according to a specified condition.

8. An image forming apparatus of claim 7, further comprising:

a timer; wherein the switch switches the discharging way every predetermined time.

9. An image forming apparatus of claim 8, further comprising:

setting means for setting a time to switch the discharging way.

10. An image forming method, comprising the steps of:

receiving image data transmitted from a first device and a second device;

discharging a sheet on which an image is formed based on image data transmitted from a first apparatus into a first bin and discharging a sheet on which an image is formed based on image data transmitted from a second apparatus into a second bin;

switching a discharging way; and discharging a sheet on which an image is formed based on image data included in a first job and transmitted from the first apparatus into the first bin and discharging a sheet on which an image is formed based on image data included in a second job and transmitted from the first apparatus into the second bin.

11. An image forming method of claim 10, wherein the discharging way is switched every predetermined time.

* * * * *